April 9, 1968    HANS-HEINRICH MÖBIUS ET AL    3,377,203
METHOD OF PRODUCING FUEL CELLS WITH SOLID ELECTROLYTES
AND CERAMIC OXIDE ELECTRODE LAYERS
Filed Nov. 18, 1964
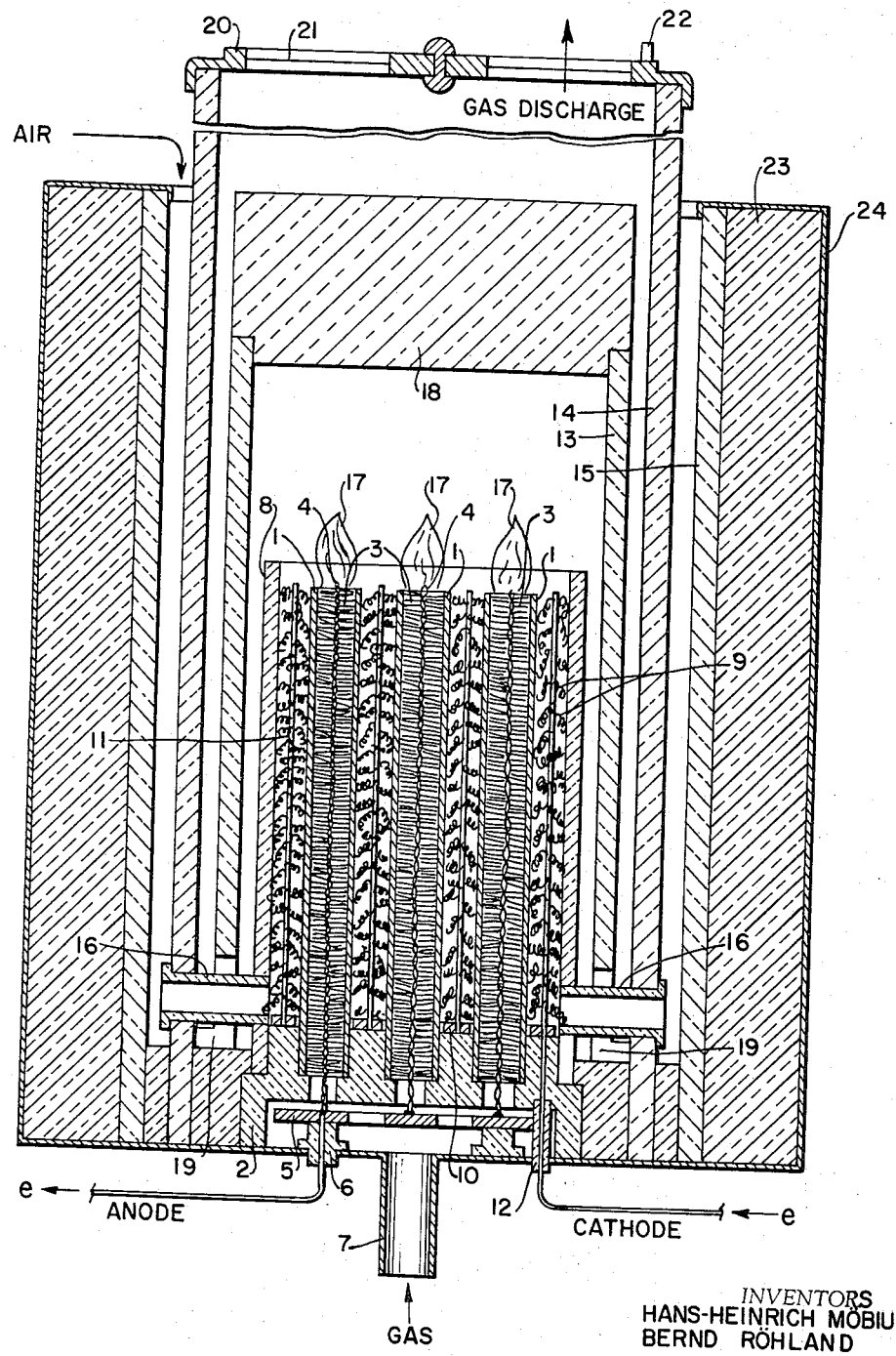
INVENTORS
HANS-HEINRICH MÖBIUS
BERND RÖHLAND 3,377,203
METHOD OF PRODUCING FUEL CELLS WITH SOLID ELECTROLYTES AND CERAMIC OXIDE ELECTRODE LAYERS
Hans-Heinrich Möbius and Bernd Röhland, Greifswald, Germany, assignors to Ernst-Moritz-Arndt-Universität, Greifswald, Germany
Filed Nov. 18, 1964, Ser. No. 412,088
10 Claims. (Cl. 136—86)

The present invention relates to the production of fuel cells with solid electrolytes and ceramic oxide electrode layers, and more particularly to the production of fuel cells which are based on oxygen ion-conducting solid electrolytes and which generate electrical current under high temperature conditions.

It has been known for a long time that oxygen ion-conducting mixed oxides of the type of Nernst masses provide very good prerequisites for the making of fuel cells. Oxygen ion-conducting solid electrolytes contain as base substance host oxides of the type of $MO_2$ and as admixture therewith foreign oxides of metal cations having two or three valences. These crystallize according to the fluoride type and exhibit oxygen ion vacancies in the anion sublattice. The greatest oxygen ion conductivity is theoretically expected, as has been confirmed by recent experiments, when oxides of tetravalent and trivalent cations of the smallest possible size are used for building up of the fluoride mixed phases, and concentrations are used of about 10–20 mol percent of foreign oxides $MO_{1.5}$. Consequently, mixed phases of zirconium dioxides with oxides of scandium, yttrium or of the lanthanides between samarian and lutetium provide the best oxygen ion conductors. The possible valence changes of samarium, europium, terbium and ytterbium cations do not cause any disturbances resulting from injurious electron conductivity when the portion of these ions corresponds substantially to the natural rare earth mixtures, namely when the total amount is only a very small percentage.

The most satisfactory solid electrolytes from the standpoint of conductivity and price are obtained from zirconium oxide and yttrium oxide with their naturally accompanying elements of the lanthanide series.

The rare earth mixtures may be partly or fully replaced by calcium oxide. In this case the temperature dependence of the electric conductivity is increased and the specific conductivity is decreased in temperature ranges below 1100° C. The cheapest oxygen ion-conducting solid electrolyte is zirconium oxide with a content of 5–7% calcium oxide.

A clear understanding has now been reached of the conditions under which optimum results may be expected with solid electrolytes. The solution of the problem of high temperature fuel cells at present depends on the production of suitable electrodes which permit the conductivity of the solid electrolyte to be fully utilized and permit to obtain maximum current exploitation by the electrochemical exchange in the cell.

According to an earlier patent, DWP Patentschrift No. 22,030, stable high temperature electrodes for fuel cells are obtained by mixed oxides of the electrolyte type with cerium, praseodymium or similar electron-conducting oxides, and sintering the same with solid electrolytes.

Extensive investigations have shown that the concentration of the oxides which cause electron conduction in the electrode substance must be very high if the electron conductivity is to be substantially greater than the conductivity of the electrolyte for oxygen ions. For example, uranium oxide which possesses some favourable qualities for the building up of electrode layers, would have to be used in as near to pure form as possible. However, in an oxidizing atmosphere, pure uranium oxide will already volatilize at only moderately elevated temperatures. The volatility can be reduced by major additions of, for example, yttrium oxide. However, by that means the electron conductivity is simultaneously lowered, and consequently the suitability thereof as an electrode material is lowered. Uranium oxide can therefore be used only for anode layers which operate in a reducing atmosphere.

Mixed oxides with cerium would appear to be more economical. Within the operating range of a fuel gas electrode (5 to 95% of $CO+H_2$ at between 800 and 1400° C.), cerium dioxide is more or less reduced to sesquioxide, depending upon the concentration of admixtures, whereupon, due to the mutual valence change of trivalent and tetravalent cerium, electron conductivity will exist.

Satisfactory valence conditions are present in the case of praseodymium oxide even in an oxidizing atmosphere, so that this oxide is suitable for the building up of the cathode.

The tetravalent and trivalent cations of uranium, cerium and praseodymium are of a size which, over a wide range of concentration of mixed oxides produced therewith, cause the formation of fluorite structure and at the same time guarantee negligible small mobility in the lattice at the operating temperature of the fuel cell. Cations such as $Ni^{2+}$, $Ni^{3+}$, $Fe^{2+}$, $Fe^{3+}$, $W^{4+}$, $W^{5+}$, and others, do not possess these qualities, so that at least with high concentrations of such cations no stable fluorite phase will result. In fact, it seems that only the uranium, cerium and praseodymium oxides can be considered as building elements for ceramic oxide electrodes.

The fact that in order to obtain useful conductivities it is necessary to use layers having a thickness of several tenths of a millimeters does not represent a substantial disvantage since electrodes based on the use of uranium, cerium and praseodymium oxides are to a great extent permeable to oxygen ions.

Cathode layers of high praseodymium oxide content, which are stable in air at temperature of 800° to 1400° C., are obtained by firmly sintering the same on to the electrolyte at about 1800° C. in an oxidizing atmosphere. In contrast thereto, anode layers having a high content of cerium oxide, when made in the same manner, are unstable under the conditions prevailing in the fuel cell. The structural changes which occur in the course of their reduction destroys the layer.

On the other hand, if both electrode layers are applied from the very beginning by sintering in an atmosphere of pure fuel gas, an unstable cathode layer will result. Upon starting operation in air, the cathode layer will disintegrate due to structural changes during the oxidation.

The simultaneous application of the electrode layer by sintering on the one hand in air, and on the other hand in fuel gas at 1800° C., causes considerable difficulties which cannot be overcome by technical expedients.

It is accordingly a primary object of the present invention to provide a method of applying the two electrode layers to an electrolyte whereby the disadvantages of the prior art which have been indicated above are avoided.

It is another object of the present invention to provide a method for the simultaneous application of the two electrode layers, i.e. the cathode layer and the anode layer, to an electrolyte in the formation of ceramic oxide electrode layers on the electrolyte whereby the fuel cell resulting from the use of such electrode layers on the electrolyte can operate without damage to either of the electrode layers.

It is yet another object of the present invention to provide a method for the simultaneous application of both electrode layers to an electrolyte of a fuel cell to provide a fuel cell for generating electric current under high temperature conditions without damage to the electrolytes.

Other objects and advantages of the present invention will be apparent from a further reading of the specification and of the appended claims.

With the above and other objects in view, the present invention mainly comprises a method of producing fuel cells comprising solid electrolyte and ceramic oxide electrode layers, comprising the sintering of the two ceramic oxide electrode layers on to the solid electrolyte in substantially the same atmosphere wherein the partial pressure of oxygen of the atmosphere is maintained, during the final sintering phase, at a medium value.

The gas atmosphere, in which the two ceramic oxide electrode layers are co-sintered to the solid electrolyte, can be of any type during heating up and the first sintering phase. In the second sintering phase, which takes place generally at temperatures between 1700 and 1900° C., the partial pressure of oxygen may be maintained at between $10^{-5}$ and $10^{-3}$ atmospheres. During subsequent cooling, the partial pressure of oxygen should gradually be lowered as much as possible.

It is preferred in accordance with the present invention that the anode layer be formed of cerium oxide and/or uranium oxide and that the cathode layer be formed predominantly of praseodymium oxide. The solid electrolyte can be of the type commonly used in such fuel cells, for example zirconium-yttrium mixed oxide or zirconium-calcium mixed oxide.

In order that the oxide ceramic electrode layers be connected durably with the solid electrolyte, the electrode material must be more or less adapted to the solid electrolyte material. For this purpose the electrode materials are, in accordance with the present invention, mixed with 5–50 mol percent pure zirconium oxide or zirconium oxide stabilized by admixtures.

It is advantageous to construct the electrode layers from a large number of very thin layers having a high content of zirconium oxide near the solid electrolyte and at the exterior electrode surface little or, no zirconium oxide. However it is technically simpler to work with a layer of a medium concentration or, in accordance with the present invention, with a small number of layers of graduated zirconium oxide concentration. During sintering the concentration gradations change by diffusion.

The sintering and adhesion capabilities of the solid electrolyte and electrode layers can be improved by addition of small quantities of foreign substances. Particularly suitable for this purpose is aluminum oxide, which has little influence on the oxygen ion conductivity of the applied mixed oxides, when only a small percentage is added. In accordance with the present invention, 0.1–5% of aluminum oxide is added to the solid electrolyte and/or to the electrode materials, according to the desired effect. In this way the required sintering temperatures can be lowered by more than 100° C.

From the properties of the ceramic materials and the operation conditions for the high temperature fuel cells, predetermined requirements of the geometric shape of the solid electrolyte cells result. The best shape apparently is a tube with open ends. In accordance with the invention the anode layer is arranged at the inner surface and the cathode layer at the outer surface of the solid electrolyte tubes.

In order to electro-chemically exchange as much as possible burning gases flowing once through such a solid electrolyte tube, and to achieve a voltage sufficiently high for practical purposes, several solid electrolyte tubes are preferably connected in series, with intermediate pieces therebetween.

As intermediate pieces it is simplest to use solid electrolyte bodies without electrode layers, these bodies being placed by means of a special glass in a gas-tight manner on the solid electrolyte tubes. The cathode of one solid electrolyte tube will be connected in an electrically conductive manner, by means of an intermediate piece or the seam between two solid electrolyte tubes, to the anode of the next solid electrolyte tube.

In accordance with a preferred embodiment of the present invention the individual ceramic oxide electrode layers are sprayed on to the solid electrolyte by means of a plasma burner.

It has been found that if the sintering of the two electrode layers with the above conditions, on to the solid electrolyte is carried out in the same atmosphere in which the partial pressure of oxygen during the end phase of sintering is between $10^{-5}$ and $10^{-3}$ atmospheres and during cooling will again drop as low as possible, then the electrode layer having the high praseodymium content will not be destroyed upon subsequent oxidation in air, and the layer with high cerium content will not be destroyed by later reduction in high percentage fuel gas.

The glow atmosphere which is used is obtained by applying a vacuum as required, or when working under normal pressure, by flushing with inert gases of the required oxygen content, or with certain gas mixtures which consist primarily of carbon dioxide with steam and inert gas, and of relatively low content of carbon monoxide plus hydrogen, in accordance with the oxygen equilibrium pressure at the sinter temperature chosen.

Good results are obtained using a mixture of 85% of $CO_2$ and 15% $CO$, which mixture has the important advantage over an inert gas-oxygen mixture that the change of the oxygen partial pressure with the temperature occurs automatically in chemical equilibrium. The same results are achieved with all gas mixtures having a volume ratio of carbon dioxide plus steam to carbon monoxide plus hydrogen in the region of about 4–20 and any admixtures of inert gas.

The following example is given to illustrate the production of fuel cells having solid electrolyte and ceramic oxide electrode layers in accordance with the present invention. The scope of the invention is not, however, meant to be limited to the specific details of the example.

The solid electrolyte consisting of 88 mol percent $ZrO_2$ and 12 mol percent $CaO$ and an addition of 1% $Al_2O_3$ should first be present as a formed, dry, unsintered blank. The electrode materials will be obtained by evaporating of aqueous nitrate solutions. This addition of aluminum oxide is about 2%.

The finely powdered electrode materials are stirred with a small amount of dilute nitrocelluloseacetone adhesive and applied to the electrolyte body in the desired thickness. The anode is formed of a single uniform layer consisting of $CeO_2$ and $ZrO_2$ in a mol-ratio of 2:1. Optimum properties of the cathode are obtained by applying two layers, one on top of the other. First, as a binding intermediate layer, a thin layer of a mixture of 65 mol percent of $PrO_{1.83}$ and 35 mol percent of $ZrO_2$ is applied by brushing on. For the thicker surface layer, a similar material with 80 mol percent $PrO_{1.83}$ is used. The dense burning of the solid electrolyte and burning of the electrode layers for firm adhesion takes place simultaneously within a few hours at a temperature of about 1850° C. During the entire period of heating up, sintering and cooling, the materials are kept under the above mentioned $CO/CO_2$ atmosphere.

In order to achieve the maximum possible conducivity, it is possible to spray a thin layer of pure praseodymium oxide on to the cathode in cold condition and in air by means of a plasma burner. In the event of even slight heating during this process, it is necessary to protect the anode from oxidation by flushing with a protective gas.

The withdrawal of current from the electrodes is effected by multiple loose contacts with metallic conductors. Pure nickel is particularly suitable at the anode side since the same, contrary to iron, is not oxidized even if the gas atmosphere has a high content of carbon dioxide and steam. The metal used at the cathode side should be an oxidation resistant metal such as a non-corrosive steel or a noble metal.

The electrode spaces are completely filled with rigid metal parts while maintaining sufficient gas permeability; current withdrawal can be improved by insertion of individual continuous wires.

For further objects and advantages of the invention and for further novel aspects thereof, reference may be had to the following description taken in conjunction with the accompanying drawing, which illustrates a simple, portable solid electrolyte battery, which may be operated with any combustible gas and will maintain itself at operating temperature.

Several solid electrolyte tubes 1 with oxide ceramic layers and a length of about 50–100 cm. stand upright on a ceramic base plate 2. Nickel wires 3 serve to conduct the electric current from the anode layers and are arranged like bristles of a bottle brush. The twisted central wires 4 extend to a perforated metallic plate 5, which collects the current of all the anodes and at 6 is insulated and extends out of the cell. The combustible gas is conveyed through tube 7 to the anode chamber. The ceramic tube 8 is limited by the cathode space at the outside of the solid electrolyte tubes 1.

The coiled, short wires 9 and strong vertical wires 11, which are screwed in the metallic plate 10, serve to conduct electric current in the cathode space. The electric connection to the metallic plate 10 is provided through a ceramic insulation tube 12. The described assembly is placed in the three ceramic tubes 13, 14 and 15. The air flow for the cathode space, this air flow having a volume approximately ten times that of the combustible gas flow, is sucked through the space between the tubes 14 and 15 and the horizontal ceramic tubes 16. The gas, which is not electro-chemically exchanged in the solid electrolyte tubes, burns at 17. Since tube 13 is covered by a ceramic plate 18, the hot waste gases are forced to flow down between tubes 8 and 13. The waste gases flow through the openings 19 of the tube 13 to the space between tubes 13 and 14 and here flow, under heat exchange through tube 14 with the air between tubes 14 and 15, up to the waste gas outlet over plate 18. A lid 20 covers the waste discharge gas tube 14. This lid has sector-shaped openings 21, which may be opened to a greater or lesser extent by the rotary valve 22. The solid electrolyte tube battery is thermally insulated from the surrounding atmosphere by ceramic material 23 and is placed in a metal casing 24.

In order to produce an increase in voltage, it is possible to separate groups of solid electrolyte tubes from each other by means of vertical ceramic plates and to electrically connect them in series. A further variant is to provide solid electrolyte tube batteries built up of assembled tubes. In accordance with the present invention these tubes are manufactured in the above-described manner by means of intermediate pieces. In the latter case the cathode space is subdivided by horizontal gas-permeable ceramic plates at the elevation of the intermediate pieces.

What is claimed is:

1. Method of producing fuel cells consisting of solid electrolyte and ceramic oxide electrode layers, which comprises simultaneously sintering a ceramic electron-conducting oxide anode layer and a ceramic electron-conducting oxide cathode layer to a solid oxygen-ion conducting electrolyte in the same atmosphere of low partial pressure of oxygen, said sintering being carried out at a temperature of between 1700° and 1900° C. while the partial pressure of oxygen, at least during the last part of the process, does not increase to more than about $10^{-3}$ atmospheres, and the atmosphere, at least during the last phase of sintering, consisting of a gas with volume ratio of carbon dioxide plus steam to carbon monoxide plus hydrogen of about 4–20 and any admixture of inert gas.

2. Method of producing a fuel cell according to claim 1, in which the partial pressure of oxygen during sintering at a temperature of between 1700° and 1900° C. at least during the last part of the process will be held at a value between about $10^{-5}$ and $10^{-3}$ atmospheres.

3. Method according to claim 1 in which the anode layer consists primarily of at least one oxide selected from the group consisting of cerium oxide and uranium oxide.

4. Method according to claim 1 in which the cathode layer consists primarily of praseodymium oxide.

5. Method of producing a fuel cell according to claim 1, in which the electrode materials are mixed with 5–50 mol percent pure zirconium oxide or zirconium oxide stabilized by admixtures.

6. Method of producing a fuel cell according to claim 1, in which the electrode layers are applied in gradations with a high concentration of zirconium oxide near the solid electrolyte, and with little or no content of zirconium oxide at the electrode layer surfaces distant from said solid electrolyte, said latter electrode layer surfaces distant from said solid electrolyte being substantially the pure electrode layer material without said zirconium oxide.

7. Method of producing a fuel cell according to claim 1, in which at least one of the solid electrolyte and the electrode materials are mixed with 0.1–0.5% of aluminum oxide.

8. Method of producing a fuel cell according to claim 1, wherein the anode layers are applied at the inside and the cathode layers are applied at the outside of the solid electrolyte tubes.

9. Method according to claim 1 in which the individual ceramic oxide electrode layers are sprayed on to the solid electrolyte by means of a plasma burner.

10. A fuel cell comprising a ceramic oxide anode layer, a ceramic oxide cathode layer and a solid electrolyte, said anode layer being an oxide selected from the group consisting of cerium oxide and uranium oxide, in the cathode layer consisting primarily of praseodymium oxide, and the electrolyte being a simple or a multiple-part tube consisting of an oxygen-ion conducting mixed oxide with a main component of zirconium oxide.

References Cited

UNITED STATES PATENTS

| 3,300,344 | 1/1967 | Bray et al. | 136—86 |
| 3,160,527 | 12/1964 | Hess | 136—86 |
| 3,138,490 | 6/1964 | Tragert | 136—86 |

FOREIGN PATENTS 22,030 10/1961 Germany.

OTHER REFERENCES

Kiukkola JES, vol. 104, No. 6, June 1957, pp. 379–382.

ALLEN B. CURTIS, *Primary Examiner.*

WINSTON A. DOUGLAS, *Examiner.*

H. FEELEY, *Assistant Examiner.*